(12) United States Patent
Aaltonen

(10) Patent No.: US 11,578,944 B2
(45) Date of Patent: Feb. 14, 2023

(54) SIGHT DISPLAY DEVICE AND METHOD FOR MANUFACTURING SIGHT DISPLAY DEVICE

(71) Applicant: BENEQ OY, Espoo (FI)

(72) Inventor: Pauli Aaltonen, Espoo (FI)

(73) Assignee: LUMINEQ OY, Espoo (FI)

( * ) Notice: Subject to any disclaimer, the term of this patent is extended or adjusted under 35 U.S.C. 154(b) by 432 days.

(21) Appl. No.: 16/639,776

(22) PCT Filed: Aug. 22, 2018

(86) PCT No.: PCT/FI2018/050594
§ 371 (c)(1),
(2) Date: Feb. 18, 2020

(87) PCT Pub. No.: WO2019/038476
PCT Pub. Date: Feb. 28, 2019

(65) Prior Publication Data
US 2021/0123704 A1 Apr. 29, 2021

(30) Foreign Application Priority Data
Aug. 23, 2017 (FI) .................................. 20175748

(51) Int. Cl.
*F41G 1/34* (2006.01)
*G02B 23/10* (2006.01)
*G02B 27/34* (2006.01)

(52) U.S. Cl.
CPC ........... *F41G 1/345* (2013.01); *G02B 23/105* (2013.01); *G02B 27/34* (2013.01)

(58) Field of Classification Search
CPC ... F41G 1/345; F41G 1/34; F41G 1/38; G02B 23/105; G02B 27/34; G02B 27/36; G02B 23/00
See application file for complete search history.

(56) References Cited

U.S. PATENT DOCUMENTS

| 3,167,677 A | 1/1965 | Fremuth |
| 3,499,112 A | 3/1970 | Heilmeier et al. |
| (Continued) | | |

FOREIGN PATENT DOCUMENTS

| CN | 101975530 A | 2/2011 |
| DE | 10049024 A1 | 12/2001 |
| (Continued) | | |

OTHER PUBLICATIONS

Office Action issued by National Intellectual Property Administration, PRC in relation to Application No. 201880054480.6 dated Nov. 2, 2021 (12 pages).

(Continued)

*Primary Examiner* — Robert E. Tallman
(74) *Attorney, Agent, or Firm* — Robert P. Michal, Esq.; Carter, DeLuca & Farrell LLP

(57) ABSTRACT

A transparent thin film electroluminescent display device includes a first transparent thin film electroluminescent display having a substrate and a first active layer capable of emitting a spectrum of light in a wavelength of visible light. The transparent thin film electroluminescent display device further includes a second transparent thin film electroluminescent display having a substrate and a second active layer, the first and second transparent thin film electroluminescent displays being arranged in a superposed manner such that the first and second active layers are spaced apart from each other for forming the transparent thin film electroluminescent display device with a superposed structure.

20 Claims, 9 Drawing Sheets

(56) References Cited

U.S. PATENT DOCUMENTS

| | | | |
|---|---|---|---|
| 3,885,861 | A | 5/1975 | Farnsworth et al. |
| 4,396,864 | A | 8/1983 | Suntola et al. |
| 4,671,165 | A | 6/1987 | Heidmann et al. |
| 4,695,161 | A | 9/1987 | Reed |
| 4,719,385 | A | 1/1988 | Barrow et al. |
| 4,794,430 | A | 12/1988 | Whittaker et al. |
| 2010/0258628 | A1 | 10/2010 | Bay |
| 2018/0128576 | A1* | 5/2018 | Zang .................... F41A 17/063 |

FOREIGN PATENT DOCUMENTS

| | | | |
|---|---|---|---|
| GB | 1432558 A | 4/1976 | |
| GB | 1496155 A | 12/1977 | |

OTHER PUBLICATIONS

Search Report issued by National Intellectual Property Administration, PRC in relation to Application No. 201880054480.6 dated Oct. 25, 2021 (2 pages).

Finnish Search Report issued by the Finnish Patent and Registration Office iin relation to Finnish Application No. 20175748 dated Mar. 19, 2018 (2 pages).

International Search Report issued by the Finnish Patent and Registration Office acting as the International Searching Authority in relation to International Application No. PCT/FI2018/050594 dated Dec. 5, 2018 (4 pages).

Written Opinon of the International Searching Authority issued by the Finnish Patent and Registration Office acting as the International Searching Authority in relation to International Application No. PCT/FI2018/050594 dated Dec. 5, 2018 (9 pages).

\* cited by examiner

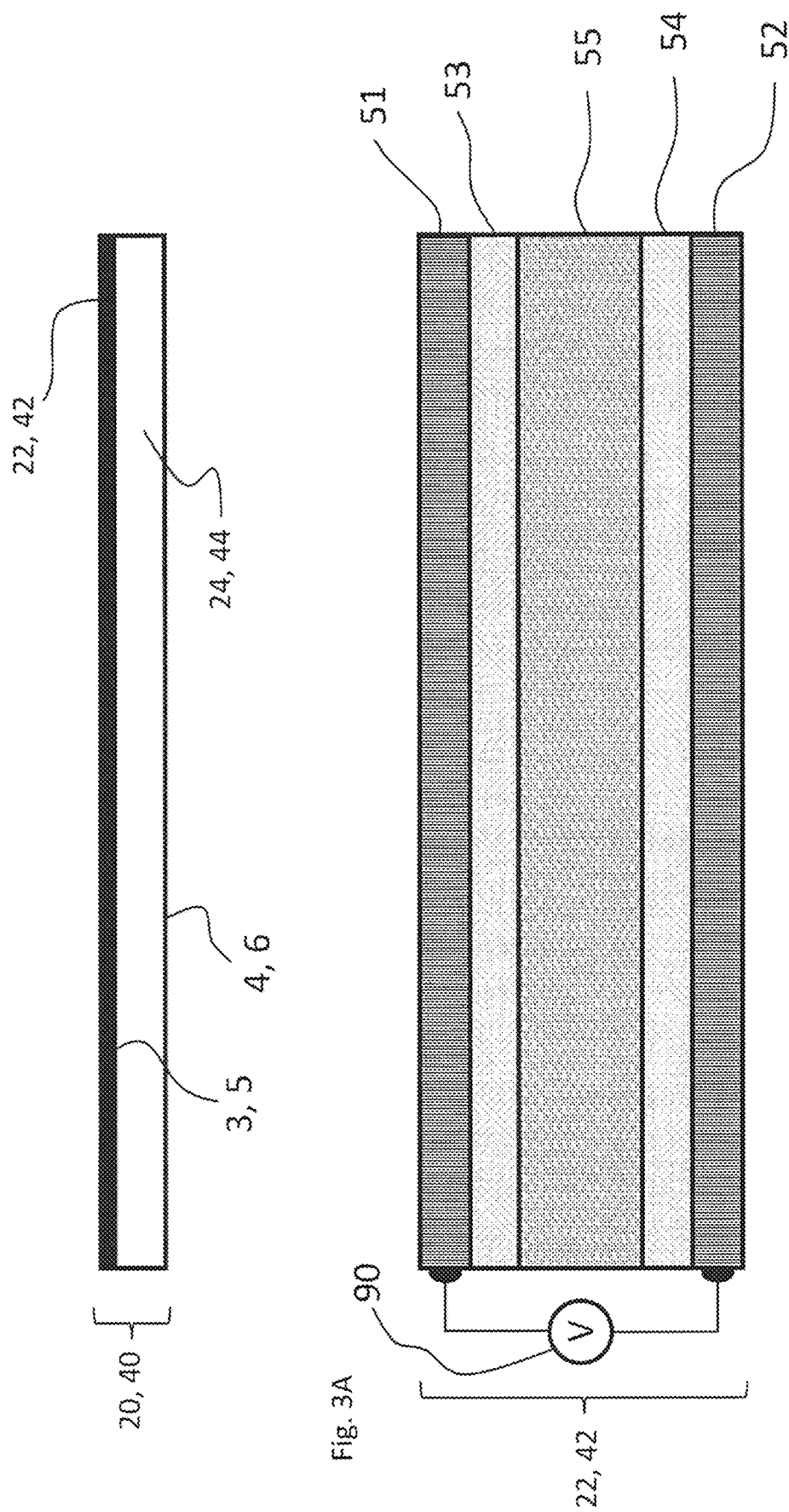

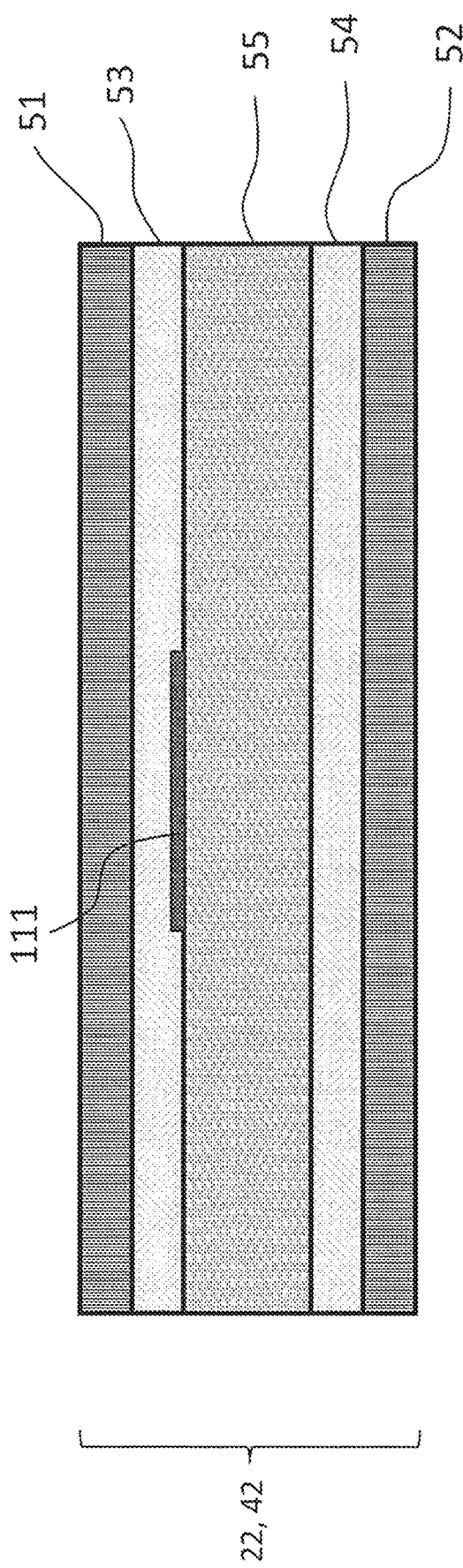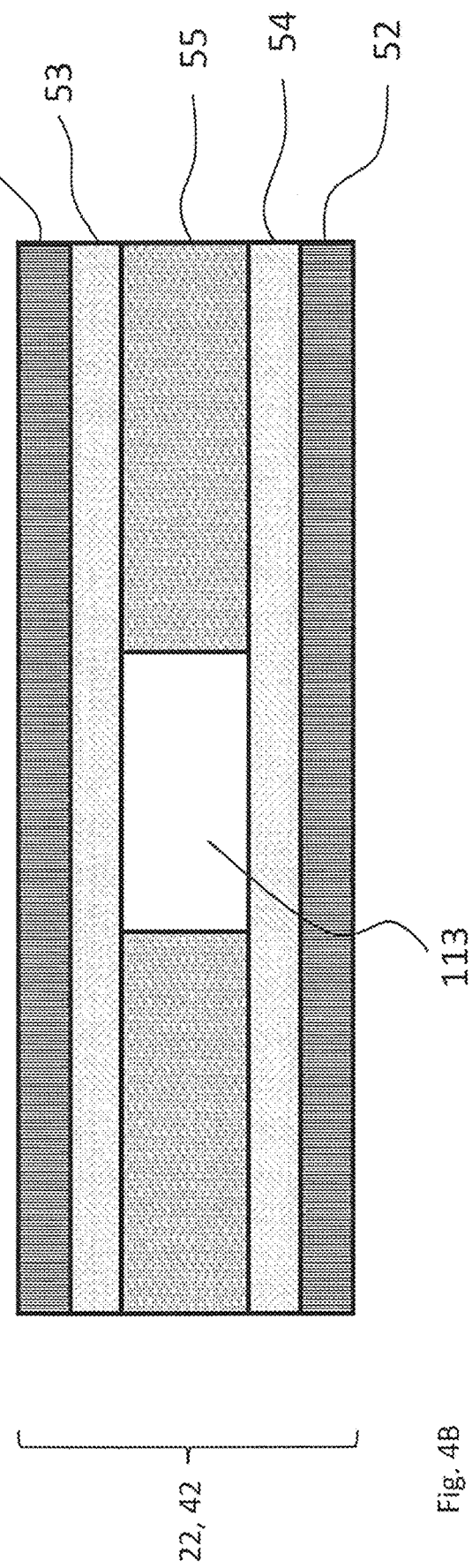

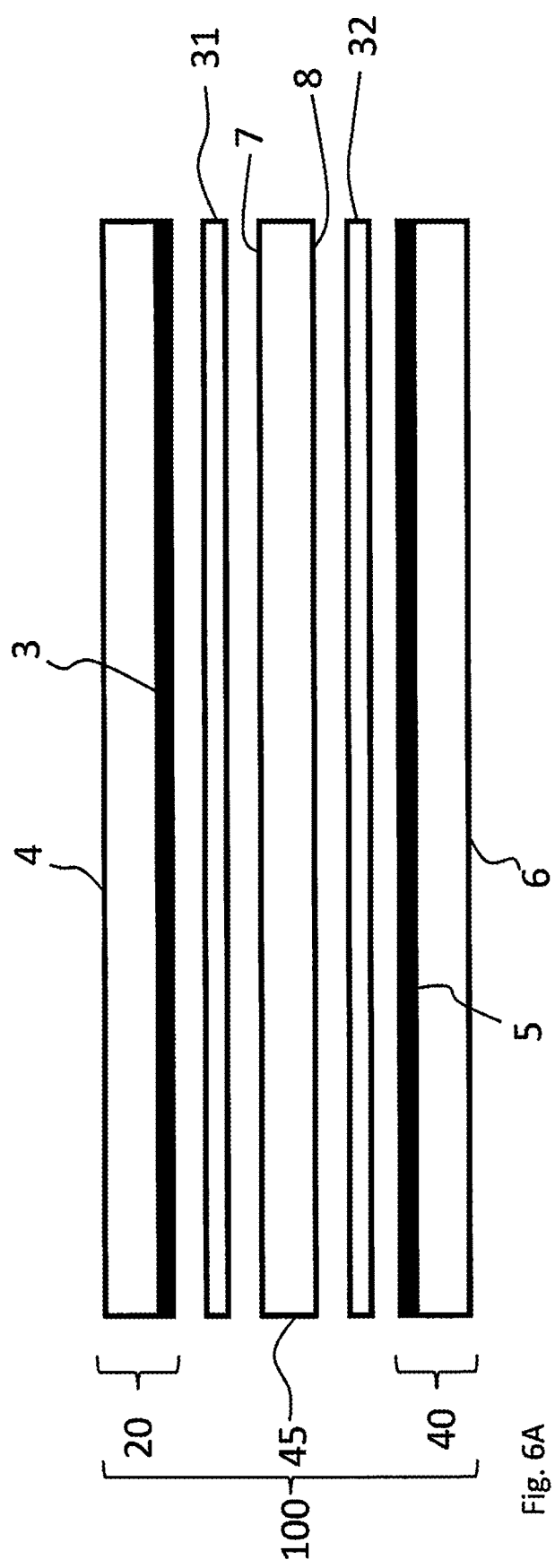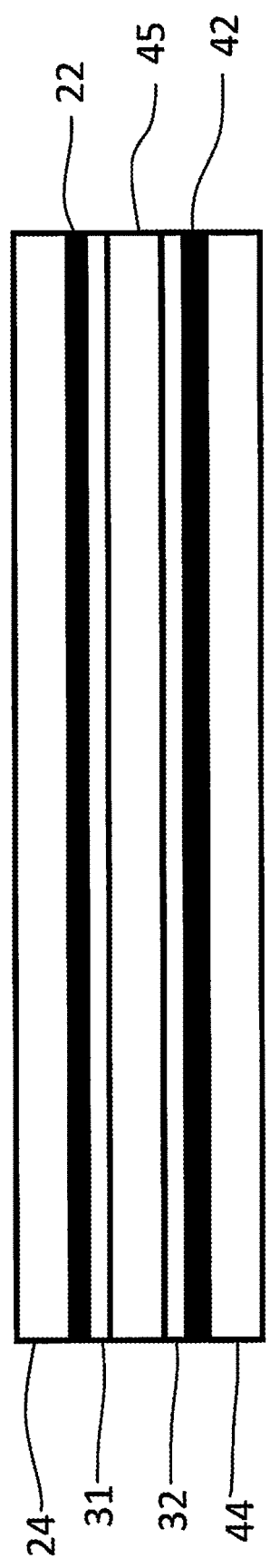
Fig. 6A
Fig. 6B

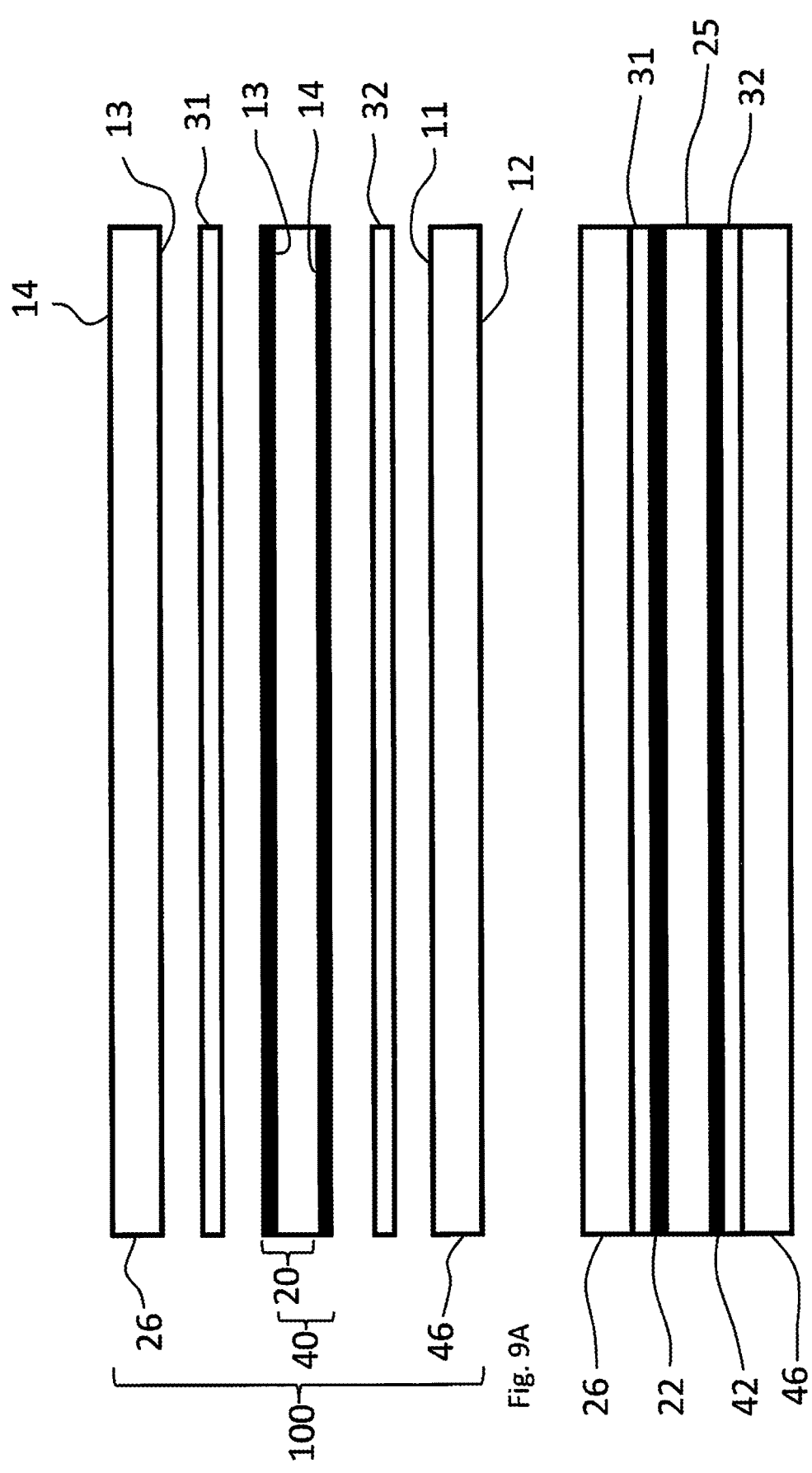

SIGHT DISPLAY DEVICE AND METHOD FOR MANUFACTURING SIGHT DISPLAY DEVICE

CROSS-REFERENCE TO RELATED APPLICATIONS

This application is a national phase entry under 35 U.S.C. 371 of PCT International Application No. PCT/FI2018/050594 filed Aug. 22, 2018, which claims priority to Finnish Patent Application No. 20175748, filed Aug. 23, 2017, the disclosure of each of these applications is expressly incorporated herein by reference in their entirety.

FIELD OF THE INVENTION

The present invention relates to a transparent thin film electroluminescent sight display device. The present invention further relates to method for manufacturing a transparent thin film electroluminescent sight display device.

BACKGROUND OF THE INVENTION

Sight devices or sight display devices are commonly used in different applications for aiming or targeting to objects behind the sight device or sight display device. Accordingly, the sight devices comprise a transparent display or lens or the like through which the user may see the object. The sight devices or sight display devices usually also comprise a crosshair for aiming or targeting to the object. The crosshair is provided to the display or lens of the sight device. In conventional sight devices the crosshair is fixed crosshair formed to the actual display panel or lens. These kind of sight devices or sight display devices may be used in weapons or weapon systems or in observation devices.

However, in many applications there is need for movable crosshair. This means that the location of the crosshair in the display or lens of the sight device can be moved. In this application the crosshair could be moved as the object moves or the crosshair may be moved to another object. Document U.S. Pat. No. 4,965,161 discloses one prior art sight device. In this sight device the crosshair is provided with one liquid crystal display. The sight device with the movable crosshair has to have necessary transparency such that the user may see the object through the sight display or lens. Furthermore, the crosshair has to be provided in high accuracy such that aiming or targeting may be accomplished at high level. The prior art crosshairs are not able to provide movable crosshair with high transparency and accuracy. The high transparency and accuracy may not be achieved prior art devices.

BRIEF DESCRIPTION OF THE INVENTION

An object of the present invention is to provide a transparent thin film electroluminescent display device and method for manufacturing the same to overcome or at least alleviate the prior art disadvantages.

The objects of the invention are achieved by a transparent thin film electroluminescent display device and by a method for manufacturing a transparent thin film electroluminescent display device.

In the present invention, electroluminescent display device is used for solving or at least alleviating the prior art disadvantages. Electroluminescent displays are known flat panel displays comprising for example a luminescent material layer between two insulator layers and two conductor layers. The mentioned layers form an active layer of the electroluminescent display. During use of the electroluminescent (EL) display a voltage is applied to the conductor layers such that an electric field is generated over the luminescent material. The electric field excites the luminescent material making it luminous. This kind of displays are thus called thin film EL displays (TFEL displays). Transparent electroluminescent displays are one important and separate subtype EL displays. In transparent electroluminescent displays (TASEL), the conductor layers, meaning the electrodes to which the voltage is applied, are provided as transparent electrodes enabling the viewer of the display to access simultaneously both the information shown on the display and information or events which are present or take place behind the display. In TASEL displays the metal conductor material is a transparent electrode material, for example indium tin oxide (ITO), so that the electrodes on both sides of the luminescent material layer are suitably transparent to light.

When the voltage is applied to the conductor layers, the luminescent material layer emits radiation in some emission wavelengths of spectrum of light in a wavelength of visible light. The light emission colour of TASEL displays depends on the physical properties of the material used as a luminescent material layer. Typical luminescent materials are e.g. ZnS:Mn (zinc sulphide doped with manganese) and ZnS:Tb (zinc sulphide doped with terbium) for yellow and green emission colours, respectively.

The present invention is based on the idea of providing a transparent sight display device capable for displaying a crosshair. The transparent sight display device comprises a first transparent thin film electroluminescent display having a substrate and a first active layer capable of emitting spectrum of light in a wavelength of visible light. The transparent sight display device further comprises a second transparent thin film electroluminescent display having a substrate and a second active layer capable of emitting spectrum of light in a wavelength of visible light. The first active layer of the first transparent thin film electroluminescent display comprises first active hairlines extending in a first direction. The second active layer of the second transparent thin film electroluminescent display comprises second active hairlines extending in a second direction. The second direction is transverse to the first direction. The first and second transparent thin film electroluminescent displays are arranged in superposed manner to a superposed structure such that the first and second active hairlines extend transversely in relation to each other such that the crosshair is formed when one first active hairline and one second active hairline are activated. The first active hairlines are longitudinal lines extending in the first direction and the second active hair lines are longitudinal lines extending in the second direction.

In one embodiment the first and second transparent thin film electroluminescent displays are arranged in superposed manner to the superposed structure such that the first and second active hairlines extend perpendicularly in relation to each other such that the crosshair is formed when one first active hairline and one second active hairline are activated.

In one embodiment of the invention the first active hairlines are operatively separate active hairlines and the second active hairlines are operatively separate hairlines such that each first active hairline and each second active hairline is arranged to be activated independently of other first and second active hairlines for providing a movable crosshair. This enables activating the any of the first and second hairlines independently, and thus a movable crosshair may be enabled.

The transparent sight display device may also comprise a first control unit connected to the first active hairlines and arranged to activate the first active hairlines, and a second control unit connected to the second active hairlines and arranged to activate the second active hairlines. In this embodiment each first active hairline may be separately connected to the first control unit and arranged to be activated independently of the other first hairlines. Similarly each second active hairline may be separately connected to the second control unit (and arranged to be activated independently of the other second hairlines.

In an alternative embodiment the transparent sight display device may comprise a common control unit connected to the first and second active hairlines and arranged to activate the first and second active hairlines. Accordingly, each first active hairline and each second active hairline may be separately connected to the common control unit and arranged to be activated independently of the other first and second hairlines.

The present invention is further based on an idea of providing a method for manufacturing a transparent sight display device capable for displaying a crosshair. The method comprises:

forming a first transparent thin film electroluminescent display having a substrate and a first active layer capable of emitting spectrum of light in a wavelength of visible light;

forming a second transparent thin film electroluminescent display having a substrate and a second active layer capable of emitting spectrum of light in a wavelength of visible light;

forming the first transparent thin film electroluminescent display comprises forming first active hairlines for forming the first active layer;

forming the second transparent thin film electroluminescent display comprises forming second active hairlines for forming the second active layer; and arranging the first and second transparent thin film electroluminescent displays in a superposed structure such that the first and second active hairlines extend transversely in relation to each other such that the crosshair is formed when one first active hairline and one second active hairline are activated.

In one embodiment of the present invention the method comprises arranging the first and second transparent thin film electroluminescent displays in a superposed structure such that the first and second active hairlines extend perpendicularly in relation to each other such that the crosshair is formed when one first active hairline and one second active hairline are activated.

The first and second transparent thin film electroluminescent displays may be arranged in the superposed structure such that the first and second active layers are spaced apart from each other.

In one embodiment, the first active hairlines are formed as operatively separate active hairlines and similarly the second active hairlines are formed as operatively separate hairlines such that each first active hairline and each second active hairline may be activated independently of other first and second active hairlines for providing a movable crosshair.

The method may comprise connecting to the first active hairlines to a first control unit connected and arranged for activating the first active hairlines and connecting the second active hairlines to a second control unit for activating the second active hairlines. Alternatively, the method may comprise connecting each first active hairline separately to a first control unit for activating independently of the other first hairlines and connecting each second active hairline separately to a second control unit for activating independently of the other second hairlines.

In another embodiment the method comprises connecting the first and second active hairlines to a common control unit for activating the first and second active hairlines. Alternative the method may comprise connecting each first active hairline and each second active hairline separately to a common control unit for activating independently of the other first and second hairlines.

An advantage of the invention is that the transparent thin film electroluminescent sight display device of the present invention enables providing a movable crosshair with the separate first and active hairlines and separate second active hairlines. The TASEL display has good transparency characteristics and it may be provided or laminated into any existing structure such as window, lens of sight or observation device or any other similar structure or device. Forming the hairlines thin, the accuracy of the crosshair may be formed to a high level.

BRIEF DESCRIPTION OF THE DRAWINGS

The invention is described in detail by means of specific embodiments with reference to the enclosed drawings, in which

FIGS. 3A and 3B show schematic views of a structure of TASEL display;

FIGS. 4A and 4B show schematic views of a structure of TASEL display with non-luminating areas;

FIGS. 6A and 6B show schematically another embodiment of the TASEL display device according to the present invention;

FIGS. 9A and 9B show schematically a further embodiment of the TASEL display device according to the present invention.

DETAILED DESCRIPTION OF THE INVENTION

Figure 1:
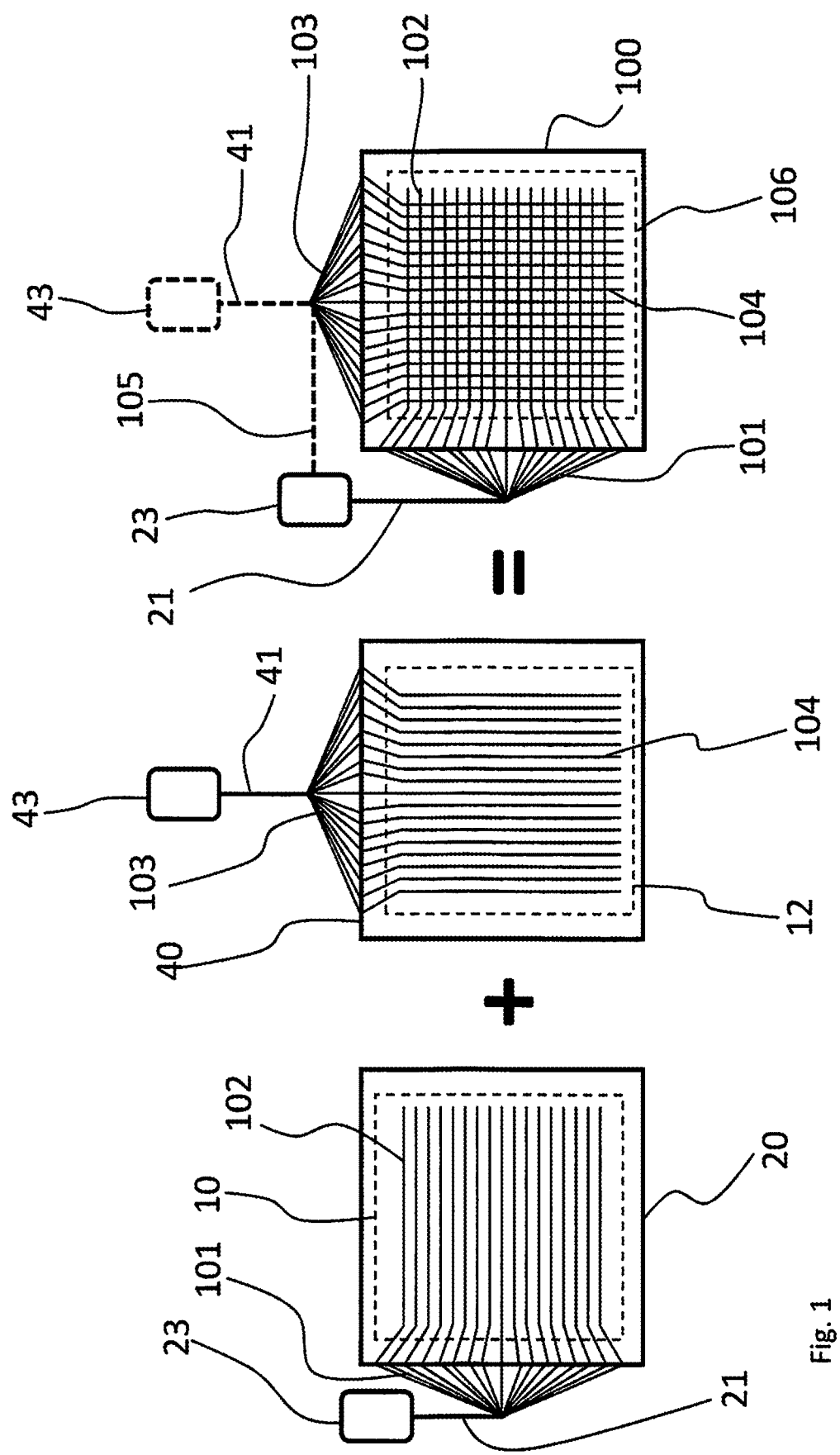
FIG. 1 shows a schematic view of superposing two TASEL displays.

FIG. 1 shows a schematic representation of the present invention. A first transparent thin film electroluminescent display 20 (TASEL display) comprising a first display element 10 capable of displaying first active hairlines 102. The first display element 10 is connected via first electric conductor 21 to a first control unit 23. In more detail, the first active hairlines 102 are separately connected to the first control unit 23 via first hairline conductors 101 and the first electric conductor 21. The first control unit 23 may comprise a microprocessor, memory and possible other components, or it may be computer or the like. The first control unit 23 may also comprise a first voltage source or it may be connected or connectable to a first voltage source for supplying voltage to the first display element 10. Accordingly, each first active hairline 102 may be controlled or activated separately with the first control unit 23, separately from each other.

FIG. 1 also shows a second transparent thin film electroluminescent display 40 (TASEL display) comprising a second display element 12 capable of displaying second active hairlines 104. The second display element 12 is connected via second electric conductor 41 to a second control unit 43. In more detail, the second active hairlines 104 are separately connected to the second control unit 43 via second hairline conductors 103 and the second electric conductor 41. The second control unit 43 may comprise a microprocessor, memory and possible other components, or it may be computer or the like. The second control unit 43 may also comprise a second voltage source or it may be connected or connectable to a second voltage source for supplying voltage to the second display element 12. Accordingly, each second active hairline 104 may be controlled or activated separately with the second control unit 43, separately from each other.

The first and second active hairlines 102, 104 form the active layers of the first and second TASEL displays. The active hairlines 102, 104 are capable of emitting spectrum of light in a wavelength of visible light when they are activated.

When the first and second TASEL displays 20, 40 are superposed, a transparent thin film electroluminescent sight display device 100 (TASEL display device) is formed. The TASEL sight display device 100 comprises two, the first and the second, TASEL displays 20, 40 in a superposed or stacked display structure. Accordingly, the first and second display elements 10, 12 are also superposed, or overlapped in the TASEL sight display device 100. As the first and second TASEL displays 20, 40 are transparent the viewer may see through the upper TASEL display to the lower TASEL display such that the viewer may see the content of both the first and second display elements 10, 12 at the same time in combined view. Accordingly, the viewer may see combination of the first and second TASEL displays 20, 40 in the TASEL sight display device 100. Furthermore, the viewer may also see information behind the TASEL sight display device 100 and the first and second TASEL displays 20, 40, as the whole TASEL sight display device 100 is transparent. In FIG. 1 the combined view of the TASEL sight display device 100 may show the first hairlines 102 of first display element 10 and the second hairlines 104 of the second display element 12 superposed or overlapping. The first and second TASEL displays 20, 40 are arranged in the superposed or stacked structure such that the first and second hairlines extend transversely, preferably perpendicularly, in relation to each other such that the combined view forms a grid of hairlines 102, 104 and a crosshair may be formed by activating one first hairline 102 and one second hairline 104. Accordingly a combined display element 106 is formed.

As seen in FIG. 1, in the TASEL display device 100 the first and second displays 20, 40 or the display elements 10, 12 have their own control units 23, 43 such that they may be controlled independently of each other. However, the first and second displays 20, 40 or the display elements 10, 12 may also comprise common control unit 23, and possibly also common voltage source, which is arranged and capable of controlling both the first and second displays 20, 40 and display elements 10, 12 at the same time and independently of each other.

The first and second displays 20, 40 may have similar, identical or different shapes or structures.

Figure 2:
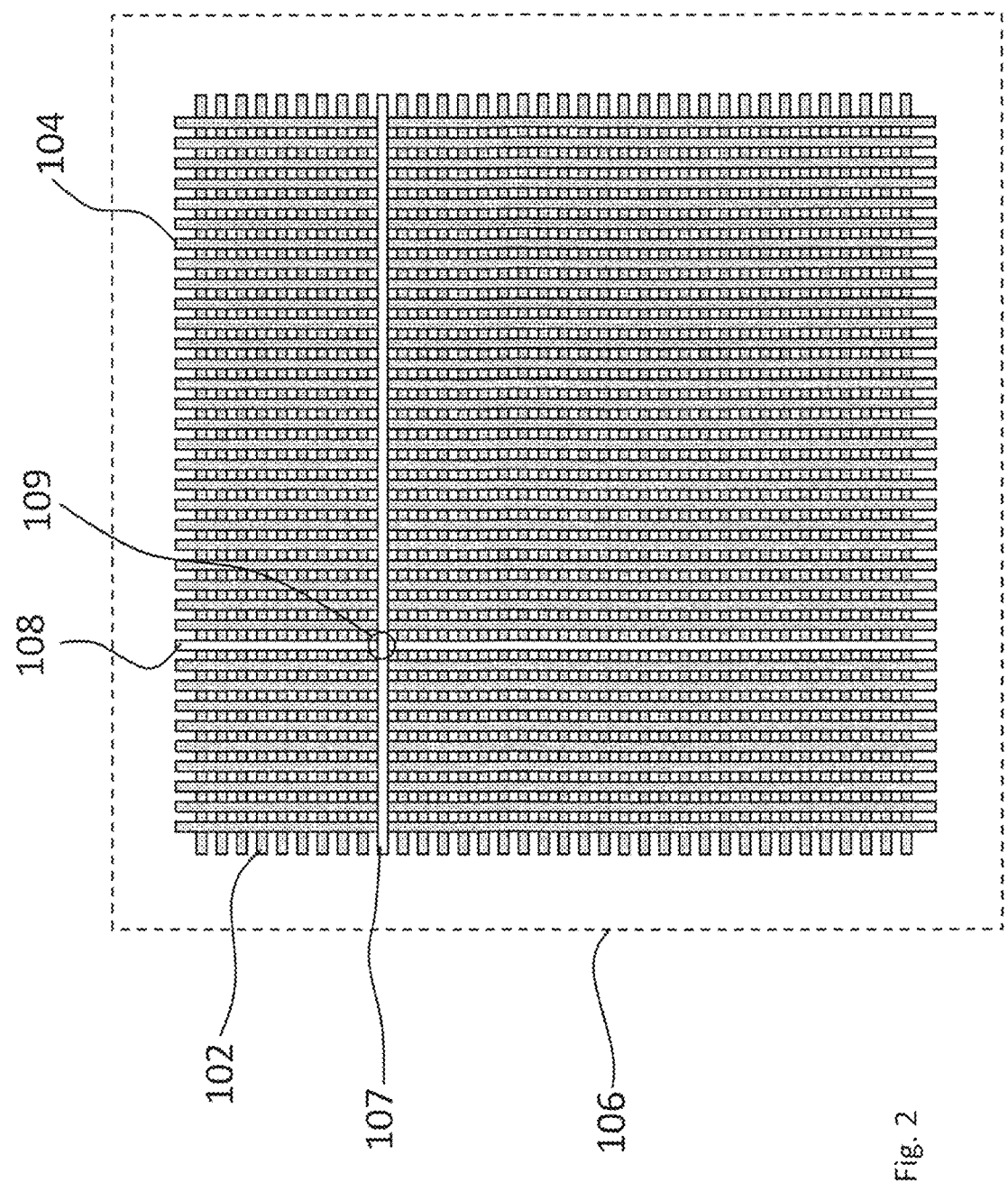
FIG. 2 active layers of two superposed TASEL displays for forming a crosshair.

FIG. 2 shows the first and second TASEL displays 20, 40 superposed or stacked. The combined display element 106 comprises the first active hairlines 102 of the first TASEL display 20 and the second active hairlines 104 of the second TASEL display 40. The first active hairlines 102 extend in a first direction and parallel to each other. However, the first active hairlines 102 may also extend in an angle relation to each other. The first active hairlines 102 may be longitudinal lines or the first active hairlines 102 may be longitudinal lines extending in the first direction. In the embodiment of FIG. 2, the first active hairlines 102 are formed at constant intervals from each other or the distance between adjacent first active hairlines 102 is constant. However, in some embodiments the distance between adjacent active first hairlines 102 may be different or may vary on at least part of the first display element 10. The second active hairlines 104 extend in a second direction and parallel to each other. However, the second active hairlines 104 may also extend in an angle relation to each other. The second active hairlines 104 may be longitudinal lines or the second active hairlines 104 may be longitudinal lines extending in the second direction. In the embodiment of FIG. 2, the second active hairlines 104 are formed at constant intervals from each other or the distance between adjacent second active hairlines 104 is constant. However, in some embodiments the distance between adjacent active second hairlines 104 may be different or may vary on at least part of the first display element 10.

As, shown in FIG. 2, the first and second TASEL displays 20, 40 are arranged in superposed manner to a superposed structure such that the first and second active hairlines 102, 104 extend perpendicularly in relation to each other. Alternatively, the first and second transparent thin film electroluminescent displays 20, 40 may be arranged in superposed manner to the superposed structure such that the first and second active hairlines 102, 104 extend transversely in relation to each other. The transversal direction between the first and second active hairlines 102, 104 may be for example between 45 to 135 degrees, or 60 to 120 degrees, or 80 to 100 degrees.

In the embodiment of FIG. 2, the distance between adjacent first active hairlines 102 is similar to the distance between adjacent active second hairlines 104. In an alternative embodiment the distance between adjacent first active hairlines 102 may be different than the distance between adjacent active second hairlines 104.

In the present invention one first active hairline 107 may be activated such that it emits spectrum of light in a wavelength of visible light. Similarly, one second active hairline 108 may be activated such that it emits spectrum of light in a wavelength of visible light. The activated first hairline 107 and the activated second hairline 108 intersect at the intersection area 109 and together form a crosshair 107, 108 emitting spectrum of light in a wavelength of visible light when activated.

FIG. 3A shows a schematic structure of a conventional TASEL display 20, 40. In this context, a TASEL display is a layered structure comprising the necessary components for light emission when connected to proper electronics and voltage source. The TASEL structure comprises a planar substrate 24, 44 having a first surface 3, 5 and a second surface 4, 6. An active layer 22, 42 is provided on the first surface 3, 5 of the substrate 24, 44. In an alternative embodiment the active layer 22, 42 may be provided on the second surface 4, 6 of the substrate 24, 44. The active layer 22, 42 comprises the necessary material layers for emitting light. The active layer 22, 42 comprises at least one luminescent material layer Substrate 24, 44 in the context of the present application is the material providing the main, rigid structure of the display. Such substrate materials may comprise glass, for example soda lime glass, borosilicate glass, or any other material with sufficient transparency. In some embodiments, substrates other than glass materials may be used, such as polymer substrates which may provide greater mechanical durability or flexibility than glass. The photopic transmission of suitable substrates is preferably greater than 60%. In some embodiments, the photopic transmission of a substrate may be greater than 80% or even greater than 90%. Substrate thickness may be in the range of 0.05 mm-5 mm or more. In some embodiments, the thickness of the substrate may be in the range of 0.3 mm-3 mm or 0.7 mm-1.2 mm, and a suitable thickness is for example about 1.1 mm.

FIG. 3B shows schematically one embodiment of the active layer 22, 42 in more detail. The structure of the active layer comprises at least one luminescent layer 55 capable of emitting light. The material of the luminescent material layer 55 may be for example material comprising zinc sulphide (ZnS), such as ZnS:Mn (zinc sulphide doped with manganese) and ZnS:Tb (zinc sulphide doped with terbium) for yellow and green emission colours, respectively. The material of the luminescent material layer 55 may also be some other material having luminescent properties. The thickness of the luminescent material layer may be in the range 30 to 250 nm, preferably in the range 50 to 200 nm and most preferably in the range 100 to 180 nm.

The active layer 22, 42 further comprises a first insulator layer 53 and a second insulator layer 54. The first and second insulator layer 53, 54 are provided on opposite surface of the luminescent material layer 55. Accordingly, the luminescent material layer 55 is provided between the first and second insulator layers 53, 54. The material of the insulator layer may be for example $Al_2O_3$, $TiO_2$, $HfO_2$, $ZrO_2$, $SiO_2$ or combinations and mixtures of these materials, or other materials, in particular oxide materials. The thicknesses of the insulator layers 53, 54 may be in the range 30 to 500 nm, more preferably in the range 50 to 200 nm. The first and second insulator layer 53, 54 may be similar or they may be different in thickness or in material.

The active layer 22, 42 further comprises a first conductor layer or first electrode layer 51 and a second conductor layer or second electrode layer 52. The first electrode layer 51 is provided on the surface of the first insulator layer 53 on opposite side in relation to the luminescent layer 55. The second electrode layer 52 is provided on the surface of the second insulator layer 54 on opposite side in relation to the luminescent layer 55. Accordingly, the insulator layers 53, 54 and the luminescent material layer 55 are provided between the first and second electrode layers 51, 52. The material of the electrode layers 51, 52 may be for example indium tin oxide (ITO), ZnO:Al, $SnO_2$ or any other conductive material with sufficient transparency for providing the TASEL display 20, 40. The thickness of the electrode layers 51, 52 may be in the range 30 to 250 nm, preferably in the range 50 to 200 nm and most preferably in the range 100 to 200 nm.

It should be noted that the active layer 22, 42 may also comprise other additional layers, such as a reflector layer(s), passivation layer(s) or barrier layer(s), in addition to the electrode layer 51, 52, insulator layers 53, 54 and the luminescent layer 55.

The term "transparent" in the present application means a structure that passes light in the visible spectrum so that the photopic transmission of the structure is above 30%, more preferably above 40% and most preferably above 50%. Thus, the transparency of a TASEL display may be defined by means of the concept photopic transmission in the visible light range. This can be measured using a double beam spectrometer, which produces a transmission spectrum with the transmission percentage as a function of the light wavelength. Photopic transmission values, as above, presented in this application are defined to be perpendicular to the display surface plane.

In this application visible light is defined such that it is the portion of the electromagnetic spectrum to which the human eye is sensitive, causing the sense of sight or vision. The spectrum of the visible light has a wavelength of approximately 380 nm-760 nm. Human eye interprets different wavelengths of visible spectrum of light as different colours. For example, light with wavelength of 580 nm is seen as yellow, light with wavelength of 545 nm is seen as green, and light with wavelength of 690 nm is seen as red colour.

As shown in FIG. 3B, voltage from a voltage source 90 is applied to the electrode layers 51, 52 such that an electric field is generated over the luminescent material layer 55. The electric field also is generated over the insulator layers 53, 54. The electric field excites the luminescent material of the luminescent material layer 55 making it luminous and emitting visible light. The voltage may be applied with the voltage source by using the control unit(s) 23, 43, as shown in FIG. 1.

A preferred manufacturing method for the active layer 22, 42 is Atomic Layer Deposition (ALD). The luminescent material layer 55 and insulator layers 53, 54, and thin films of barrier and passivation layers may be provided using ALD. ALD is a generally known coating method in which one or more surfaces of a substrate or other such surface are subjected to alternating surface reactions of at least a first and second gaseous precursors. One ALD cycle is completed when the surface to be coated is subjected once to both the first and second precursors. By repeating the cycle, material layers of different thicknesses can be achieved.

However, also other methods may be used in manufacturing one or more of thin film layers of the active layer 22, 42, such as evaporation methods, vapour deposition methods or various sputtering techniques. One manufacturing method for patterning of thin films and particularly for patterning transparent electrode layers are commonly known, including lithography and printing methods.

In the present invention, the TASEL sight display device 100 comprises a first transparent thin film electroluminescent display 20 having a substrate 24, 44 and a first active layer 22 capable of emitting spectrum of light in a wavelength of visible light, as shown in FIGS. 1, 3A and 3B. The TASEL sight display device 100 of the present invention further comprises a second transparent thin film electroluminescent display 40 having a substrate 24, 44 and a second active layer 42 capable of emitting spectrum of light in a wavelength of visible light. The first and second transparent thin film electroluminescent displays 20, 40 are arranged in superposed, stacked or overlapping manner such that the first and second active layers 22, 42 are superposed and spaced apart from each other for forming the transparent thin film electroluminescent sight display device 100 with a superposed structure. In the present invention, the first active layer 22 comprises or consists of the first active hairlines 102. Furthermore, the second active layer 42 comprises or consists of the second active hairlines 104. In other words, the first and second active layers 22, 42 may be formed by the first and second active hairlines 102, 104, respectively.

In one embodiment, the TASEL sight display device 100 first and second active layers 22, 42 are arranged between first cover layer and a second cover layer. Therefore, the TASEL sight display device 100 comprises the first cover layer and the second cover layer. The first and second active layers 22, 42 being provided between the first and second cover layers. The cover layers may protect the first and second display 20, 40 from damages and capsulate the active layers 22, 42 inside the superposed structure of the TASEL sight display devise 100. Cover layers may be the outermost material layers in the TASEL sight display device 100.

The cover layers may be manufactured of same material as the substrates, for example from glass material or polymer material.

In one embodiment, the first cover layer may be a separate first cover layer or a first substrate on which the first active layer 22 is provided is formed as the first cover layer. In an alternative embodiment, the second cover layer is a separate second cover layer or a second substrate on which the second active layer 42 is provided is formed as the second cover layer. In another embodiment, the first and second cover layers are separate cover layer. In a yet alternative embodiment, the first cover layer is the first substrate 24 on which the first active layer is provided and the second cover layer is the second substrate on which the second active layer 42 is provided.

In the stacked or superposed structure of the TASEL display devise 100, the first and second active layers 22, 42 are separated or spaced apart from each other with one or more material layers. In one embodiment, an adhesive layer is provided between the first and second active layers such that the first and second active layers 22, 42 are separated or spaced apart from each other. In an alternative embodiment, a middle cover layer and at least one adhesive layer, usually two adhesive layers, are provided between the first and second active layers 22, 42 such that the first and second active layers 22, 42 are separated or spaced apart from each other. In another embodiment, at least one substrate and at least one adhesive layer is provided between the first and second active layers 22, 42 such that the first and second active layers 22, 42 are separated or spaced apart from each other. Alternatively, a substrate is provided between the first and second active layers 22, 42 such that the first and second active layers 22, 42 are separated or spaced apart from each other and the active layers are on opposite surfaces of the substrate.

The adhesive layer or layers are provided to the superposed structure of the TASEL display device 100 for attaching or bonding different material layers together. The adhesive material may be a resin, polyvinyl butaryl (PVB), a heat curable epoxy, light curable acrylic adhesive or any other suitable adhesive material. Thickness of the adhesive layer may be in the range 5-100 μm, preferably 10-50 μm.

When the crosshair 107, 108 is formed by activating one first active hairline 102 and one second active hairline 104 they both emit spectrum of light in a wavelength of visible light. Accordingly, the first and second active hairlines 102, 104 provide the intersection areas 109 in the superposed structure of the transparent sight display device 100 in the viewing direction of the transparent sight display device 100. Thus there is double illumination in the intersection area 109, as shown in FIG. 2. In some applications, the double illumination may too bright or unwanted feature. This double illumination may be prevented such that the first active hairlines 102 may be formed non-luminating at the intersection areas 109. Alternatively, the second active hairlines 104 may be formed non-luminating at the intersection areas 109. Therefore, only one of the first and second active hairlines 102, 104 emits light at the intersection area 109 and the double illumination is prevented.

FIGS. 4A and 4B show embodiments for forming the first or second active hairline 102, 104 non-luminating at the intersection area 109. In the embodiment of FIG. 4A, the active layer 22, 42 or the active hairline 102, 104 comprises at least barrier layer 111 provided to the intersection area 109 for preventing the light from the luminescent material layer 55 to be emitted from the active layer 22, 42. The barrier layer 111 may be a reflector or the like. The barrier layer 111, may be provided on one side of the luminescent material layer 55 or only on one side. The barrier layer 111 may be provided between the luminescent material layer 55 and the insulator layer 53, 54, or between the insulator layer 53, 54 and the electrode layer 51, 52, or on the outer surface of the electrode layer 51, 52.

FIG. 4B shows an alternative embodiment, in which there is no luminescent material layer 55 or it is removed in the intersection area 109 of the first or second active hairlines 102, 104. Thus, there is non-luminating area 113 corresponding the intersection area 109. The non-luminating area 113 may be filled with filler material or with the insulator material of the insulator layer 53.

As shown in FIGS. 1 and 2, the present invention provides transparent sight display device 100 capable for displaying a crosshair 107, 108. The transparent sight display device 100 comprises the first transparent thin film electroluminescent display 20 having the substrate 24, 44 and the first active layer 22 capable of emitting spectrum of light in a wavelength of visible light. The transparent sight display device 100 further comprises a second transparent thin film electroluminescent display 40 having a substrate 24, 44 and a second active layer 42 capable of emitting spectrum of light in a wavelength of visible light. According to the invention the first active layer 22 of the first transparent thin film electroluminescent display 20 comprises the first active hairlines 102 extending in a first direction. The second active layer 42 of the second transparent thin film electroluminescent display 40 comprises the second active hairlines 104 extending in a second direction. The second direction is transverse to the first direction. The first and second transparent thin film electroluminescent displays 20, 40 are further arranged in superposed manner to the superposed structure such that the first and second active hairlines 102, 104 extend transversely in relation to each other such that the crosshair 107, 108 is formed when one first active hairline 102 and one second active hairline 104 are activated.

The first active hairlines 102 are operatively and/or structurally separate active hairlines and the second active hairlines 104 are operatively and/or structurally separate hairlines. Therefore, each first active hairline 102 and each second active hairline 104 may be arranged to be activated independently of other first and second active hairlines 102, 104 for providing a movable crosshair 107, 108. This means that each first active hairline 102 may be activated to emit light independently of the other first active hairlines 102 or second active hairlines 104 by using the first control unit 23 or common control unit. Similarly, each second active hairline 104 may be activated to emit light independently of the other second active hairlines 104 or first active hairlines 102 by using the second control unit 43 or common control unit. Activating, different first and second hairlines 102, 104 the crosshair 107, 108 may be provided at a desired location of the transparent sight display device 100.

As shown in FIG. 1, the transparent sight display device 100 may comprise a first control unit 23 connected to the first active hairlines 102 and arranged to activate the first active hairlines 102. The second control unit 43 may be connected to the second active hairlines 104 and arranged to activate the second active hairlines 104. In an alternative embodiment, the common control unit 23 may be connected to the first and second active hairlines 102, 104 and arranged to activate the first and second active hairlines 102, 104. In this case the second active hairlines 104 may be connected to the common control unit 23 via second hairline conductors 103 and a third electric conductor 105.

In one embodiment, each first active hairline 102 may be separately connected to the first control unit 23 and arranged to be activated independently of the other first hairlines 102. Furthermore, each second active hairline 104 may be separately connected to the second control unit 43 and arranged to be activated independently of the other second hairlines 102. Alternatively, each first active hairline 102 and each second active hairline 104 may be separately connected to the common control unit 23 and arranged to be activated independently of the other first and second hairlines 102, 104.

In the following some detailed structures of the TASEL sight display device 100 are described.

Figure 5A:
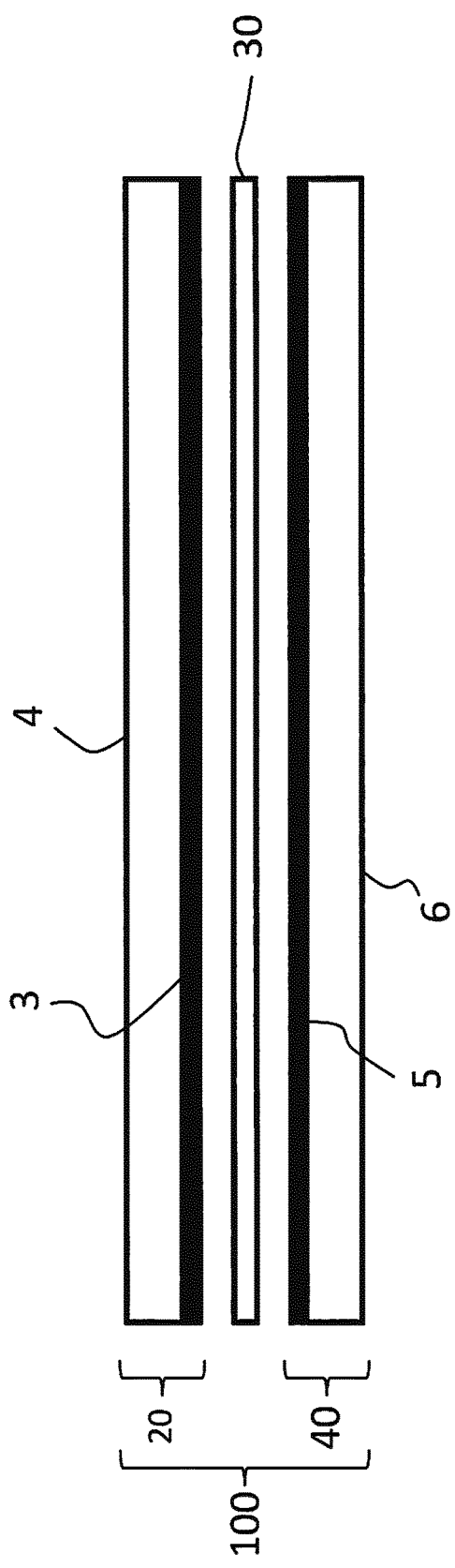
FIGS. 5A and 5B show schematically one embodiment of the TASEL display device according to the present invention.
Figure 5B:
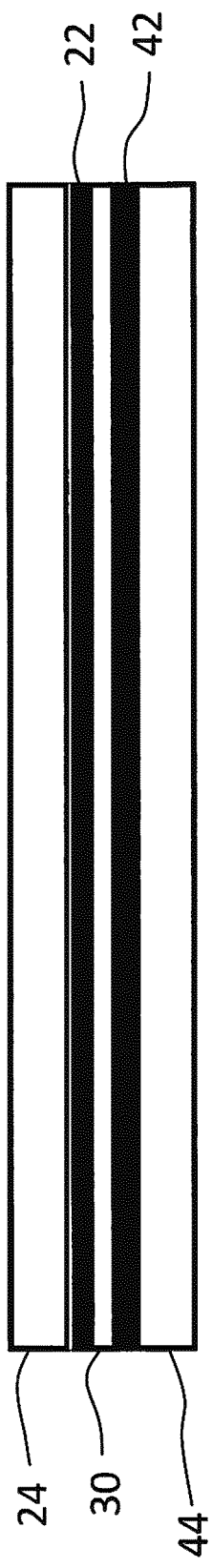

FIGS. 5A and 5B show one embodiment of the present invention. FIG. 5A shows an exploded view of the superposed or stacked structure of the TASEL display device 100 and the FIG. 5B shows the superposed or stacked structure as it is in the TASEL display device 100. The TASEL display device 100 comprises a first TASEL display 20 comprising a first planar or flat substrate or substrate layer 24 having a first surface 3 and a second surface 4, and a first active layer 22 provided on the first surface 3 of the first substrate 24. The TASEL display device 100 also comprises a second TASEL display 40 comprising a second planar or flat substrate or substrate layer 44 having a first surface 5 and a second surface 6, and a second active layer 42 provided on the first surface 5 of the second substrate 44. In the stacked or superposed structure of the TASEL display device 100, the first surface 3, 5 of the first and second substrates 24, 44 and the first and second active layers 22, 42 are towards each other. The first and second TASEL displays 20, 40 are attached or bonded together with an intermediate adhesive layer 30. The intermediate adhesive layer 30 is provided between the first and second TASEL displays 20, 40. More particularly the intermediate adhesive layer 30 is provided between the first and second active layers 22, 42 such that the intermediate adhesive layer 30 separates the first and second active layers 22, 42 from each other.

In this embodiment, the first substrate 24 forms the first cover layer and the second substrate 44 forms the second cover layer of the TASEL display device 100.

The superposed structure of the TASEL display device 100 of FIGS. 5A and 5B provides thin and light as well as highly transparent structure. In this superposed structure, the parallax shift is minimized.

FIGS. 6A and 6B show one embodiment of the present invention. FIG. 6A shows an exploded view of the superposed or stacked structure of the TASEL display device 100 and the FIG. 6B shows the superposed or stacked structure as it is in the TASEL display device 100. The TASEL display device 100 comprises the first TASEL display 20 comprising a first planar or flat substrate or substrate layer 24 having the first surface 3 and the second surface 4, and the first active layer 22 provided on the first surface 3 of the first substrate 24. The TASEL display device 100 also comprises a second TASEL display 40 comprising the second planar or flat substrate or substrate layer 44 having the first surface 5 and the second surface 6, and the second active layer 42 provided on the first surface 5 of the second substrate 44. In the stacked or superposed structure of the TASEL display device 100, the first surface 3, 5 of the first and second substrates 24, 44 and the first and second active layers 22, 42 are towards each other. The TASEL display device 100 further comprises an intermediate cover layer 45. The intermediate cover layer 45 is provided between the first and second TASEL displays 20, 40. More particularly the intermediate cover layer 45 is provided between the first and second active layers 22, 42 such that the intermediate cover layer 45 separates the first and second active layers 22, 42 from each other. The intermediate cover layer 45 comprises a first surface 7 and a second surface 8. In the embodiment of FIGS. 6A and 6B, the first surface 7 of the intermediate cover layer 45 is towards the first active layer 22 and the second surface of the intermediate cover layer 45 towards the second active layer 42. The TASEL display device 100 further comprises a first adhesive layer 31 provided between the first TASEL display 20 and the intermediate cover layer 45 for attaching the intermediate cover layer 45 to the first TASEL display 20. More particularly, the first adhesive layer 31 is provided between the first active layer 22 and the intermediate cover layer 45, or first surface 7, for attaching the intermediate cover layer 45 to the first TASEL display 20. The TASEL display device 100 further comprises a second adhesive layer 32 provided between the second TASEL display 40 and the intermediate cover layer 45 for attaching the intermediate cover layer 45 to the second TASEL display 40. More particularly, the second adhesive layer 32 is provided between the second active layer 42 and the intermediate cover layer 45, or second surface 8, for attaching the intermediate cover layer 45 to the second TASEL display 40. Thus, the first and second TASEL displays 20, 40 are attached or bonded together with the first and second adhesive layers 31, 32. The first and second adhesive layers 31, 32 and the intermediate cover layer 45 are provided between the first and second TASEL displays 20, 40. More particularly the first and second adhesive layers 31, 32 and the intermediate cover layer 45 are provided between the first and second active layers 22, 42 such that the first and second adhesive layers 31, 32 and the intermediate cover layer 45 separate the first and second active layers 22, 42 from each other.

In this embodiment, the first substrate 24 forms the first cover layer and the second substrate 44 forms the second cover layer of the TASEL display device 100.

The superposed structure of the TASEL display device 100 of FIGS. 6A and 6B provides a rather thick and heavy structure. This structure provides structural resistance damages.

Figure 7A:
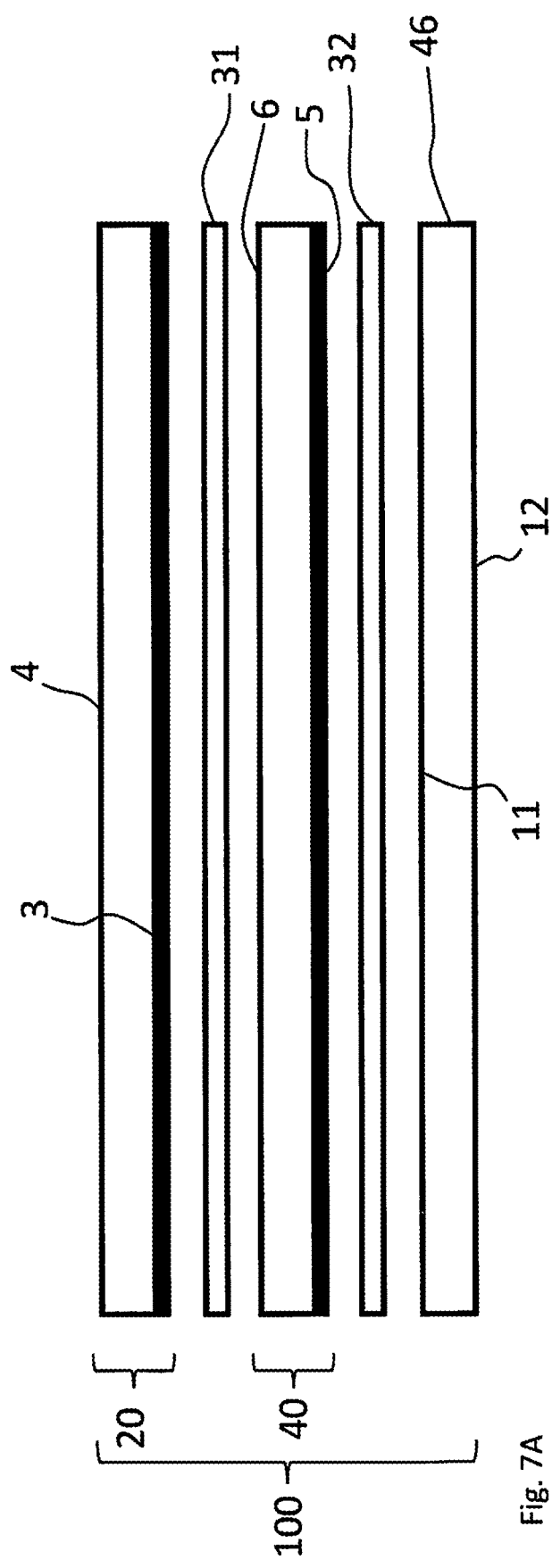
FIGS. 7A and 7B show schematically still another embodiment of the TASEL display device according to the present invention.
Figure 7B:
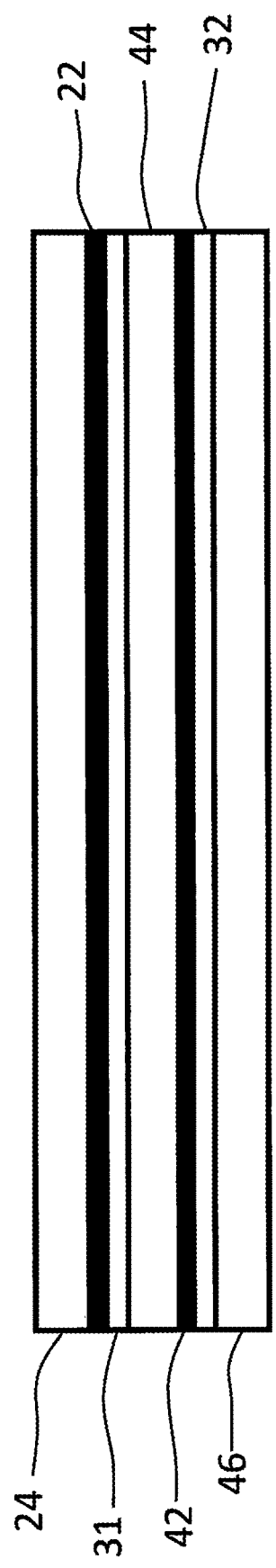

FIGS. 7A and 7B show one embodiment of the present invention. FIG. 7A shows an exploded view of the superposed or stacked structure of the TASEL display device 100 and the FIG. 7B shows the superposed or stacked structure as it is in the TASEL display device 100. The TASEL display device 100 comprises the first TASEL display 20 comprising a first planar or flat substrate or substrate layer 24 having the first surface 3 and the second surface 4, and the first active layer 22 provided on the first surface 3 of the first substrate 24. The TASEL display device 100 also comprises a second TASEL display 40 comprising the second planar or flat substrate or substrate layer 44 having the first surface 5 and the second surface 6, and the second active layer 42 provided on the first surface 5 of the second substrate 44. In the stacked or superposed structure of the TASEL display device 100, the first surface 3 of the first substrate 24 is arranged towards the second surface 6 of the second substrate 44. The TASEL display device 100 further comprises a second cover layer 46 having a first surface 11 and a second surface 12. The second cover layer 46 is provided on the second TASEL displays 40. More particularly the second cover layer 46 is provided on the first surface 5 of the second substrate and on the second active layer 42 such that the second active layer 42 is between the second substrate 44 and the second cover layer 46. The TASEL display device 100 further comprises a first adhesive layer 31 provided between the first TASEL display 20 and the second TASEL display 40 for attaching the first TASEL display 20 to the second TASEL display 40. More particularly, the first adhesive layer 31 is provided between the first active layer 22 and the second substrate 44, or the second surface 6 of the second substrate 44, for attaching the first TASEL display 20 to the second TASEL display 40. Thus, the first and second TASEL displays 20, 40 are attached or bonded together with the first adhesive layers 31 such that the first adhesive layer 31 and the second substrate 44 separate the first and second active layers 22, 42 from each other. The TASEL display device 100 further comprises a second adhesive layer 32 provided between the second TASEL display 40 and the second cover layer 46, or the first surface 11, for attaching the second TASEL display 40 to the second cover layer 46. More particularly, the second adhesive layer 32 is provided between the second active layer 42 and the second cover layer 46.

In this embodiment, the first substrate 24 forms the first cover layer and the second cover layer 46, as separate cover layer, forms the second cover layer of the TASEL display device 100.

The superposed structure of the TASEL display device 100 of FIGS. 7A and 7B is simple to manufacture and provides a rather thick and heavy structure. This structure provides structural resistance damages.

Figure 8A:
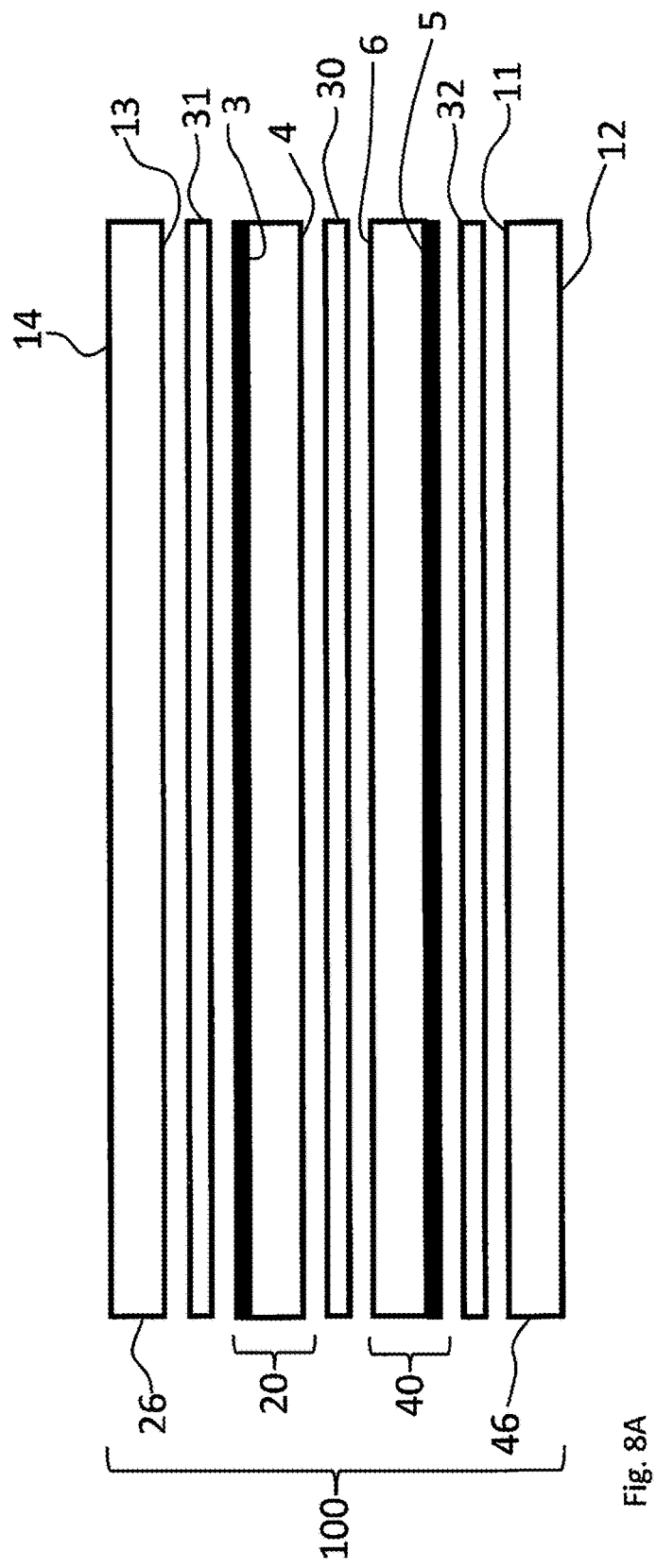
FIGS. 8A and 8B show schematically yet another embodiment of the TASEL display device according to the present invention.
Figure 8B:
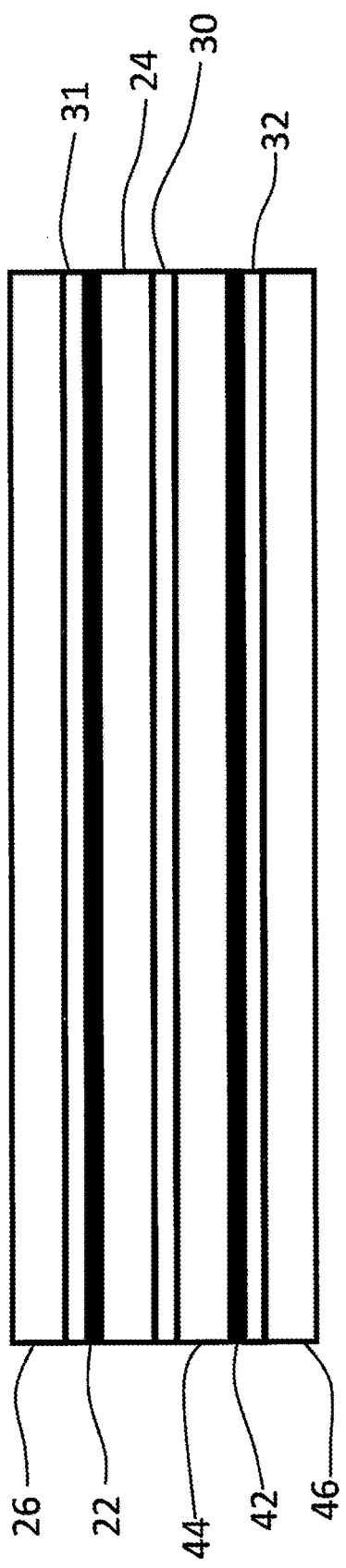

FIGS. 8A and 8B show one embodiment of the present invention. FIG. 8A shows an exploded view of the superposed or stacked structure of the TASEL display device 100 and the FIG. 8B shows the superposed or stacked structure as it is in the TASEL display device 100. The TASEL display device 100 comprises the first TASEL display 20 comprising a first planar or flat substrate or substrate layer 24 having the first surface 3 and the second surface 4, and the first active layer 22 provided on the first surface 3 of the first substrate 24. The TASEL display device 100 also comprises a second TASEL display 40 comprising the second planar or flat substrate or substrate layer 44 having the first surface 5 and the second surface 6, and the second active layer 42 provided on the first surface 5 of the second substrate 44. In the stacked or superposed structure of the TASEL display device 100, the first and second TASEL displays 20, 40 are arranged superposed such that second surface 4 of the first substrate 24 and the second surface 6 of the second substrate 44 are arranged towards each other. In other words, the first and second TASEL displays 20, 40 are arranged superposed such that first surface 3 of the first substrate 24 and the first surface 5 of the second substrate 44, or the first active layer 22 and the second active layer 42, are arranged away each other in the superposed structure of the TASEL display device 100. The TASEL display device 100 further comprises an intermediate adhesive layer 30 provided between the first substrate 24 and the second substrate 44 for attaching the first and second TASEL displays 20, 40 together in the superposed structure of the TASEL display device 100. More particularly, the intermediate adhesive layer 30 may be provided between the second surface 4 of the first substrate 24 and the second surface 6 of the second substrate 44 for attaching the first and second TASEL displays 20, 40 together. The TASEL display device 100 also may comprise a first cover layer 26 having a first surface 13 and the second surface 14. The first cover layer 26 is provided on the first TASEL display 20, or on the first surface 3 of the first substrate 24. More particularly, the first cover layer 26 may be provided on the first active layer 22. The TASEL display device 100 further comprises a first adhesive layer 31 provided between the first TASEL display 20 and the first cover layer 26 for attaching the first TASEL display 20 to the first cover layer 46. More particularly, the first adhesive layer 31 is provided between the first active layer 22 and the first cover layer 26, or the first surface 13. The TASEL display device 100 also may comprise a second cover layer 46 comprising a first surface 11 and a second surface 12. The second cover layer 46 is provided on the second TASEL display 40, or on the first surface 5 of the second substrate 44. More particularly, the second cover layer 46 may be provided on the second active layer 42. The TASEL display device 100 further comprises a second adhesive layer 32 provided between the second TASEL display 40 and the second cover layer 46, or first surface 11, for attaching the second TASEL display 40 to the second cover layer 46. More particularly, the second adhesive layer 32 is provided between the second active layer 42 and the second cover layer 46. Accordingly, the intermediate adhesive layer 30 is provided between the first and second TASEL displays 20, 4 and between the first and second substrates 24, 44. Thus, the first and second TASEL displays 20, 40 are attached or bonded together with the intermediate adhesive layer 30 such that the intermediate adhesive layer 30, the first substrate 24 and the second substrate 44 separate the first and second active layers 22, 42 from each other.

In this embodiment, the first cover layer 26, as separate cover layer, forms the first cover layer and the second cover layer 46, as separate cover layer, forms the second cover layer of the TASEL display device 100.

The superposed structure of the TASEL display device 100 of FIGS. 8A and 8B is simple to manufacture and provides a rather thick and heavy structure.

This structure provides structural resistance damages.

FIGS. 9A and 9B show one embodiment of the present invention. FIG. 9A shows an exploded view of the superposed or stacked structure of the TASEL display device 100 and the FIG. 9B shows the superposed or stacked structure as it is in the TASEL display device 100. The TASEL display device 100 comprises the first TASEL display 20 comprising a common planar or flat substrate or substrate layer 24 having the first surface 13 and the second surface 14, and the first active layer 22 provided on the first surface 13 of the common substrate 25. The TASEL display device 100 also comprises a second TASEL display 40 comprising the common planar or flat substrate or substrate layer 25 having the first surface 13 and the second surface 14, and the second active layer 42 provided on the second surface 14 of the common substrate 25. Accordingly, in this embodiment the first and second active layers 22, 42 are provided to a common substrate 25 and on opposite surface of the common substrate 25. In the stacked or superposed structure of the TASEL display device 100, the first and second TASEL displays 20, 40 are arranged superposed such that the first active layer 22 and the second active layer 42, are arranged away from each other. The TASEL display device 100 also may comprise a first cover layer 26 comprising a first surface 13 and a second surface 14. The first cover layer 26 is provided on the first TASEL display 20, or on the first surface 13 of the common substrate 25. More particularly, the first cover layer 26 may be provided on the first active layer 22. The TASEL display device 100 further comprises a first adhesive layer 31 provided between the first TASEL display 20 and the first cover layer 26, or the first surface 13, for attaching the first TASEL display 20 to the first cover layer 46. More particularly, the first adhesive layer 31 is provided between the first active layer 22 and the first cover layer 26. The TASEL display device 100 also may comprise a second cover layer 46 comprising a first surface 11 and a second surface 12. The second cover layer 46 is provided on the second TASEL display 40, or on the second surface 14 of the common substrate 25. More particularly, the second cover layer 46 may be provided on the second active layer 42. The TASEL display device 100 further comprises a second adhesive layer 32 provided between the second TASEL display 40 and the second cover layer 46, or first surface 11, for attaching the second TASEL display 40 to the second cover layer 46. More particularly, the second adhesive layer 32 is provided between the second active layer 42 and the second cover layer 46. Accordingly, the common substrate 25 is provided between the first and second substrates 24, 44. Thus, the first and second TASEL displays 20, 40 are provided such that the common substrate 25 separates the first and second active layers 22, 42 from each other.

In this embodiment, the first cover layer 26, as separate cover layer, forms the first cover layer and the second cover layer 46, as separate cover layer, forms the second cover layer of the TASEL display device 100.

The superposed structure of the TASEL display device 100 of FIGS. 9A and 9B is simple structure and provides a rather thick and heavy structure. This structure provides structural resistance damages.

According to the above mentioned, the first and second transparent thin film electroluminescent displays 20, 40 may be arranged in superposed manner such that the first and second active layers 22, 42 are spaced apart from each other for forming the transparent sight display device 100 with the superposed structure. The first and second active layers 22, 42 may be spaced apart from each other in the superposed structure of the transparent sight display device 100 such that the adhesive layer 30 is provided between the first and second active layers 22, 42. In another embodiment the middle cover layer 45 and at least one adhesive layer 31, 32 may be provided between the first and second active layers 22, 42. In a yet alternative embodiment at least one substrate 24, 44 and at least one adhesive layer 31, 32) may be provided between the first and second active layers 22, 42. Alternative a substrate 24, 44 may be provided between the first and second active layers 22, 42.

Furthermore, the transparent sight display device 100 may comprise the first cover layer 24, 26 and the second cover layer 44, 46. The first and second active layers 22, 42 are provided between the first and second cover layers 24, 26, 44, 46. This may be achieved such that the first cover layer is the separate first cover layer 26 or the first substrate 24 on which the first active layer 22 is provided. This may also be achieved such that the second cover layer is the separate second cover layer 46 or the second substrate 44 on which the second active layer 42 is provided. Alternatively, the first cover layer is the separate first cover layer 26 or the first substrate 24 on which the first active layer 22 is provided and the second cover layer is the separate second cover layer 46 or the second substrate 44 on which the second active layer 42 is provided.

It may be generalized that the present invention provides a sight display device having superposed or stacked structure comprising two the transparent thin film electroluminescent displays stacked or superposed on each other. This means that the display device comprises two separate and independent active layers provided in one integral structure. The separate and independent active layers may be controlled independently. The separate and independent active layers may be different in structure, size and materials.

The present invention further provides a method for manufacturing a TASEL sight display device 100. The method comprises forming a first transparent thin film electroluminescent display 20 having a substrate 24, 44 and a first active layer 22 capable of emitting spectrum of light in a wavelength of visible light. The method also comprises forming a second transparent thin film electroluminescent display 40 having a substrate 24, 44 and a second active layer 42 capable of emitting spectrum of light in a wavelength of visible light. The first and second TASEL displays 20, 40 may be formed by using ALD method such that the active layers 22, 42 are grown on the substrate(s) 24, 44. The active layers 22, 42 may be deposited using suitable gaseous precursor materials for each material layer of the active layers 22, 42. Alternatively, one or more other methods may be used for providing the active layers 22, 42 or any material layer of the active layers 22, 42 on the substrates 24, 44, as disclosed above.

The method of the present invention further comprises arranging the first and second TASEL displays 20, 40 in a superposed structure such that the first and second active layers 22, 42 are spaced apart from each other for forming the TASEL display device 100.

In one embodiment of the present invention the first active layer 22 is provided on a first substrate 24 for forming the first TASEL display 20. The second active layer 42 is provided on a second substrate 44 for forming the second TASEL display 40. The first and second TASEL displays 20, 40 are attached or bonded together in superposed manner for forming the TASEL display device 100 having the superposed structure. The first and second TASEL displays may be attached to each other using one or more adhesive layers provided between the first and second TASEL displays 20, 40.

The method may also comprise attaching an intermediate cover layer 45 between the first and second active layers 22, 42 of the first TASEL display 20 and the second TASEL display 40. Alternatively or additionally, the method may comprise attaching a first cover layer 26 on the first active layer 22 of the first TASEL display 20 and/or a second cover layer 46 on the second active layer 42 of the second TASEL display 40.

In one embodiment of the invention, the first active layer 22 may be provided on a first surface 3 of the first substrate 24 for forming the first TASEL display 20. The second active layer 42 may be provided on a second surface 4 of the first substrate 24 for forming the second TASEL display 40 and the TASEL sight display device 100 having the superposed structure. The embodiment may comprise attaching a first cover layer 26 on the first active layer 22 of the first TASEL display 20 and/or a second cover layer 46 on the second active layer 42 of the second TASEL display 40.

This method may be used for forming any structure of the TASEL display device, for example the embodiments disclosed above and in the figures.

The invention is also based on the idea of proving a method for manufacturing a transparent thin film electroluminescent sight display device. In the method forming the first transparent thin film electroluminescent display 20 may comprise forming first active hairlines 102 for forming the first active layer 22 and forming the second transparent thin film electroluminescent display 40 comprises forming second active hairlines 102 for forming the second active layer 42. Then the first and second transparent thin film electroluminescent displays 20, 40 are arranged in the superposed structure such that the first and second active hairlines 102, 104 extend transversely, preferably perpendicularly, in relation to each other such that the crosshair 107, 108 is formed when one first active hairline 102 and one second active hairline 104 are activated.

The method may comprise forming the first active hairlines 102 as operatively separate active hairlines and forming the second active hairlines 104 as operatively separate hairlines such that each first active hairline 102 and each second active hairline 104 is capable of being activated independently of other first and second active hairlines 102, 104 for providing a movable crosshair 107, 108.

In one embodiment of the method, the first active hairlines (102) are connected or separately connected to the first control unit 23 and arranged for activating the first active hairlines 102. The second active hairlines 104 are connected or separately connected to the second control unit 43 for activating the second active hairlines 104. In another embodiment, the method comprises connecting or separately connecting the first and second active hairlines 102, 104 to the common control unit 23 for activating the first and second active hairlines 102, 104.

The method may further comprises arranging the first and second transparent thin film electroluminescent displays 20, 40 in the superposed structure such that the first and second active layers 22, 42 are spaced apart from each other. This may be achieved by providing the adhesive layer 30 between the first and second active layers 22, 42 or providing the intermediate cover layer 45 and at least one adhesive layer 31, 32 between the first and second active layers 22, 42. Alternatively, the method may comprise providing at least one substrate 24, 44 and at least one adhesive layer 31, 32 between the first and second active layers 22, 42, or providing a substrate 24, 44 between the first and second active layers 22, 42.

The method may also comprise providing the first active layer 22 on the first substrate 24 for forming the first transparent thin film electroluminescent display 20 and providing the second active layer 42 on the second substrate 44 for forming the second transparent thin film electroluminescent display 40. The first and second transparent thin film electroluminescent displays 20, 40 are attached together in superposed manner for forming transparent sight display device 100 having the superposed structure.

In an alternative embodiment, the method comprises providing the first active layer 22 on the first surface 3 of the first substrate 24 for forming the first transparent thin film electroluminescent display 20 and providing the second active layer 42 on the second surface 4 of the first substrate 24 for forming the second transparent thin film electroluminescent display 40 and the transparent sight display device 100 having the superposed structure.

The method of the present invention may further comprise attaching the first cover layer 26 on the first active layer 22 of the first transparent thin film electroluminescent display 20, or attaching a second cover layer 46 on the second active layer 42 of the second transparent thin film electroluminescent display 40. Alternatively, the method comprises attaching the first cover layer 26 on the first active layer 22 of the first transparent thin film electroluminescent display 20 and the second cover layer 46 on the second active layer 42 of the second transparent thin film electroluminescent display 40. In another embodiment, an intermediate cover layer 45 is attached between the first and second active layers 22, 42 of the first transparent thin film electroluminescent display 20 and the second transparent thin film electroluminescent display 40.

The invention has been described above with reference to the examples shown in the figures. However, the invention is in no way restricted to the above examples but may vary within the scope of the claims.

The invention claimed is:

1. A transparent sight display device capable for displaying a crosshair, the transparent sight display device comprising a first transparent thin film electroluminescent display having a substrate and a first active layer capable of emitting spectrum of light in a wavelength of visible light, wherein:
   the transparent sight display device further comprises a second transparent thin film electroluminescent display having a substrate and a second active layer capable of emitting spectrum of light in a wavelength of visible light;
   the first active layer of the first transparent thin film electroluminescent display comprises first active hairlines extending in a first direction;
   the second active layer of the second transparent thin film electroluminescent display comprises second active hairlines extending in a second direction, the second direction being transverse to the first direction; and
   the first and second transparent thin film electroluminescent displays are arranged in superposed manner to a superposed structure such that the first and second active hairlines extend transversely in relation to each other such that the crosshair is formed when one first active hairline and one second active hairline are activated.

2. The transparent sight display device according to claim 1, wherein the first and second transparent thin film electroluminescent displays are arranged in superposed manner to the superposed structure such that the first and second active hairlines extend perpendicularly in relation to each other such that the crosshair is formed when one first active hairline and one second active hairline are activated.

3. The transparent sight display device according to claim 1, wherein the transparent sight display device comprises:
   a first control unit connected to the first active hairlines and arranged to activate the first active hairlines; and
   a second control unit connected to the second active hairlines and arranged to activate the second active hairlines; or
   a common control unit connected to the first and second active hairlines and arranged to activate the first and second active hairlines.

4. The transparent sight display device according to claim 1, wherein the first active hairlines are operatively separate active hairlines and the second active hairlines are operatively separate hairlines such that each first active hairline and each second active hairline is arranged to be activated independently of other first and second active hairlines for providing a movable crosshair.

5. The transparent sight display device according to claim 3, wherein each first active hairline is separately connected to the first control unit and arranged to be activated independently of the other first hairlines; and each second active hairline is separately connected to the second control unit and arranged to be activated independently of the other second hairlines; or each first active hairline and each second active hairline is separately connected to the common control unit and arranged to be activated independently of the other first and second hairlines.

6. The transparent sight display device according to claim 1, wherein the first and second active hairlines provide an intersection areas in the superposed structure of the transparent sight display device in the viewing direction of the transparent sight display device, and that:

the first active hairlines are formed non-luminating at the intersection areas; or the second active hairlines are formed non-luminating at the intersection areas.

7. The transparent sight display device according to claim 1, wherein the first and second transparent thin film electroluminescent displays being arranged in superposed manner such that the first and second active layers are spaced apart from each other for forming the transparent sight display device with a superposed structure.

8. The transparent sight display device according to claim 1, wherein the transparent sight display device comprises a first cover layer and a second cover layer, the first and second active layers are provided between the first and second cover layers.

9. The transparent sight display device according to claim 8, wherein:

the first cover layer is a separate first cover layer or a first substrate on which the first active layer is provided; or the second cover layer is a separate second cover layer or a second substrate on which the second active layer is provided; or the first cover layer is a separate first cover layer or a first substrate on which the first active layer is provided and the second cover layer is a separate second cover layer or a second substrate on which the second active layer is provided.

10. The transparent sight display device according to claim 1, wherein the first and second active layers are spaced apart from each other in the superposed structure of the transparent sight display device such that:

an adhesive layer is provided between the first and second active layers; or a middle cover layer and at least one adhesive layer is provided between the first and second active layers; or at least one substrate and at least one adhesive layer is provided between the first and second active layers; or a substrate is provided between the first and second active layers.

11. A method for manufacturing a transparent sight display device capable for displaying a crosshair, the method comprising:

forming a first transparent thin film electroluminescent display having a substrate and a first active layer capable of emitting spectrum of light in a wavelength of visible light, wherein the method further comprises:

forming a second transparent thin film electroluminescent display having a substrate and a second active layer capable of emitting spectrum of light in a wavelength of visible light;

forming the first transparent thin film electroluminescent display comprises forming first active hairlines for forming the first active layer;

forming the second transparent thin film electroluminescent display comprises forming second active hairlines for forming the second active layer;

arranging the first and second transparent thin film electroluminescent displays in a superposed structure such that the first and second active hairlines extend transversely in relation to each other such that the crosshair is formed when one first active hairline and one second active hairline are activated.

12. The method according to claim 11, wherein the method comprises arranging the first and second transparent thin film electroluminescent displays in a superposed structure such that the first and second active hairlines extend perpendicularly in relation to each other such that the crosshair is formed when one first active hairline and one second active hairline are activated.

13. The method according to claim 11, wherein the method comprises arranging the first and second transparent thin film electroluminescent displays in the superposed structure such that the first and second active layers are spaced apart from each other.

14. The method according to claim 13, wherein the method comprises:

providing an adhesive layer between the first and second active layers; or providing an intermediate cover layer and at least one adhesive layer between the first and second active layers; or providing at least one substrate and at least one adhesive layer between the first and second active layers; or providing a substrate between the first and second active layers.

15. The method according to claim 11, wherein the method comprises:

providing the first active layer on a first substrate for forming the first transparent thin film electroluminescent display;

providing the second active layer on a second substrate for forming the second transparent thin film electroluminescent display; and attaching the first and second transparent thin film electroluminescent displays together in superposed manner for forming transparent sight display device having the superposed structure.

16. The method according to claim 11, wherein the method comprises:

providing the first active layer on a first surface of the first substrate for forming the first transparent thin film electroluminescent display; and providing the second active layer on a second surface of the first substrate for forming the second transparent thin film electroluminescent display and the transparent sight display device having the superposed structure.

17. The method according to claim 11, wherein the method comprises:

attaching a first cover layer on the first active layer of the first transparent thin film electroluminescent display; or attaching a second cover layer on the second active layer of the second transparent thin film electroluminescent display; or attaching a first cover layer on the first active layer on the first transparent thin film electroluminescent display and a second cover layer on the second active layer of the second transparent thin film electroluminescent display; or attaching an intermediate cover layer between the first and second active layers of the first transparent thin film electroluminescent display and the second transparent thin film electroluminescent display.

18. The method according to claim 11, wherein forming the first active hairlines as operatively separate active hairlines and forming the second active hairlines as operatively separate hairlines such that each first active hairline and each second active hairline is capable of being activated independently of other first and second active hairlines for providing a movable crosshair.

19. The method according to claim 11, wherein the method comprises:
   connecting to the first active hairlines to a first control unit for activating the first active hairlines; and
   connecting the second active hairlines to a second control unit for activating the second active hairlines; or
   connecting each first active hairline separately to a first control unit for activating independently of the other first hairlines; and
   connecting each second active hairline separately to a second control unit for activating independently of the other second hairlines; or
   connecting the first and second active hairlines to a common control unit for activating the first and second active hairlines; or
   connecting each first active hairline and each second active hairline separately to a common control unit for activating independently of the other first and second hairlines.

20. The method according to claim 11, wherein the first and second active hairlines hairlines provide an intersection areas in the superposed structure of the transparent sight display device in the viewing direction of the transparent sight display device, and that the method comprises:
   forming the first active hairlines non-luminating at the intersection areas; or
   forming the second active hairlines non-luminating at the intersection areas.

* * * * *